3 Sheets—Sheet 1.

N. C. LEWIS.
Machine for Making Nails.

No. 225,066. Patented Mar. 2, 1880.

WITNESSES:
Geo. H. Brandon
Edith Whitehorn

INVENTOR:
Nathan C. Lewis
BY David A. Burr
ATTORNEY.

N. C. LEWIS.
Machine for Making Nails.

No. 225,066. Patented Mar. 2, 1880.

WITNESSES:

INVENTOR:
Nathan C. Lewis
BY David A. Burr
ATTORNEY.

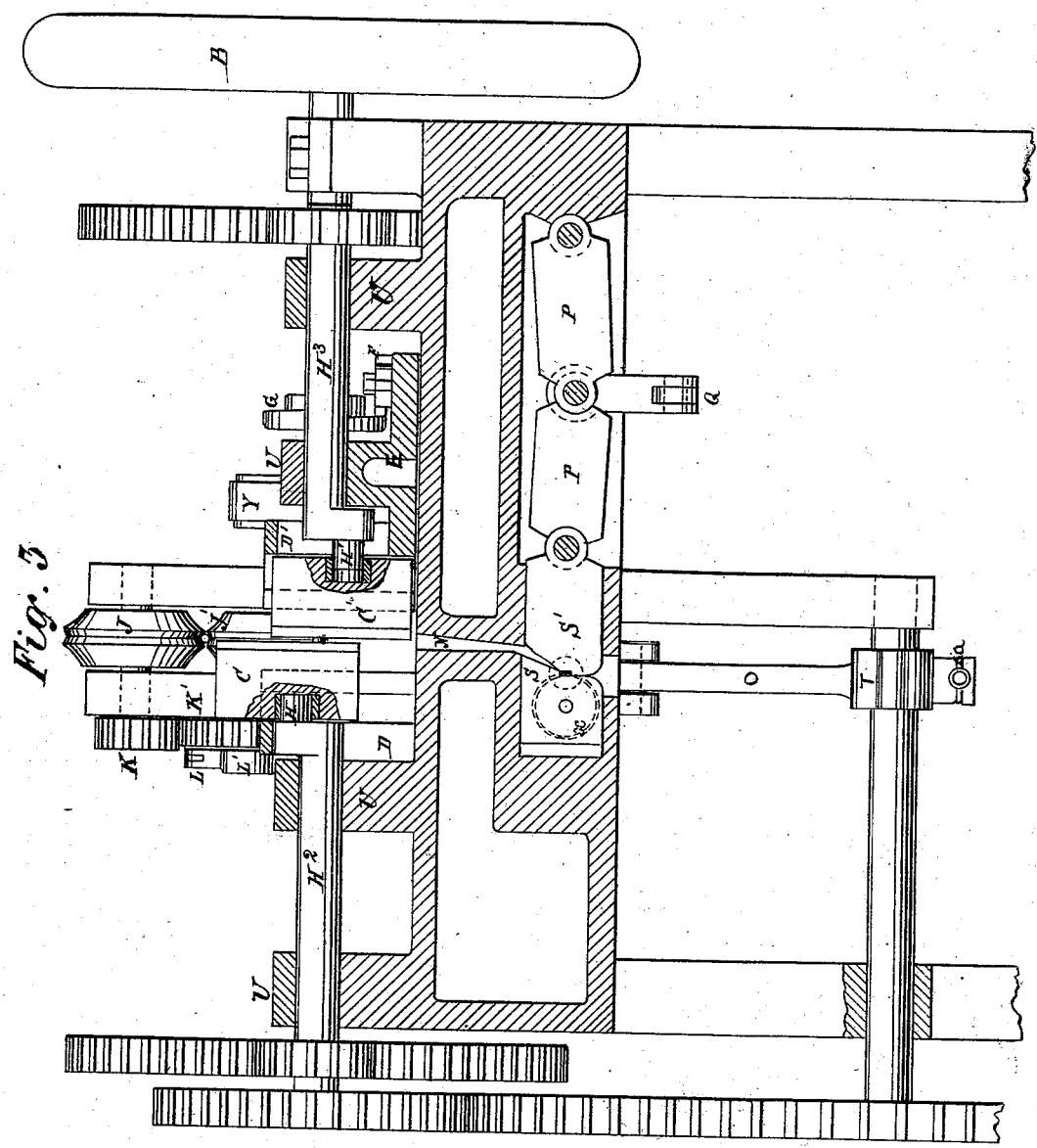
N. C. LEWIS.
Machine for Making Nails.
No. 225,066. Patented Mar. 2, 1880.

UNITED STATES PATENT OFFICE.

NATHAN C. LEWIS, OF BOSTON, MASSACHUSETTS.

MACHINE FOR MAKING NAILS.

SPECIFICATION forming part of Letters Patent No. 225,066, dated March 2, 1880.

Application filed November 4, 1879.

*To all whom it may concern:*

Be it known that I, N. C. LEWIS, of Boston, in the county of Suffolk and State of Massachusetts, have invented a new and useful Improvement in Machines for Making Nails, of which the following is a specification.

This invention relates to the manufacture of nails from wire, and more especially to the manufacture of horseshoe-nails.

It consists in the combination of reciprocating dies formed with beveled faces and traversing, face to face, in parallel planes, each in a direction contrary to the other, and which are arranged to close upon a bit of wire inserted between them, and to shape it by rolling it into two tapering pointed blanks, with suitable heading and swaging dies, and with reciprocating shaping-dies, so that the pointed blanks shall be caught, divided, headed, and flattened so soon as released from said shaping-dies, and delivered as finished nails, all as is hereinafter fully described.

The object of my said invention is to form two nails from a single wire blank at one operation by means of simple and effective machinery.

Figure 1:
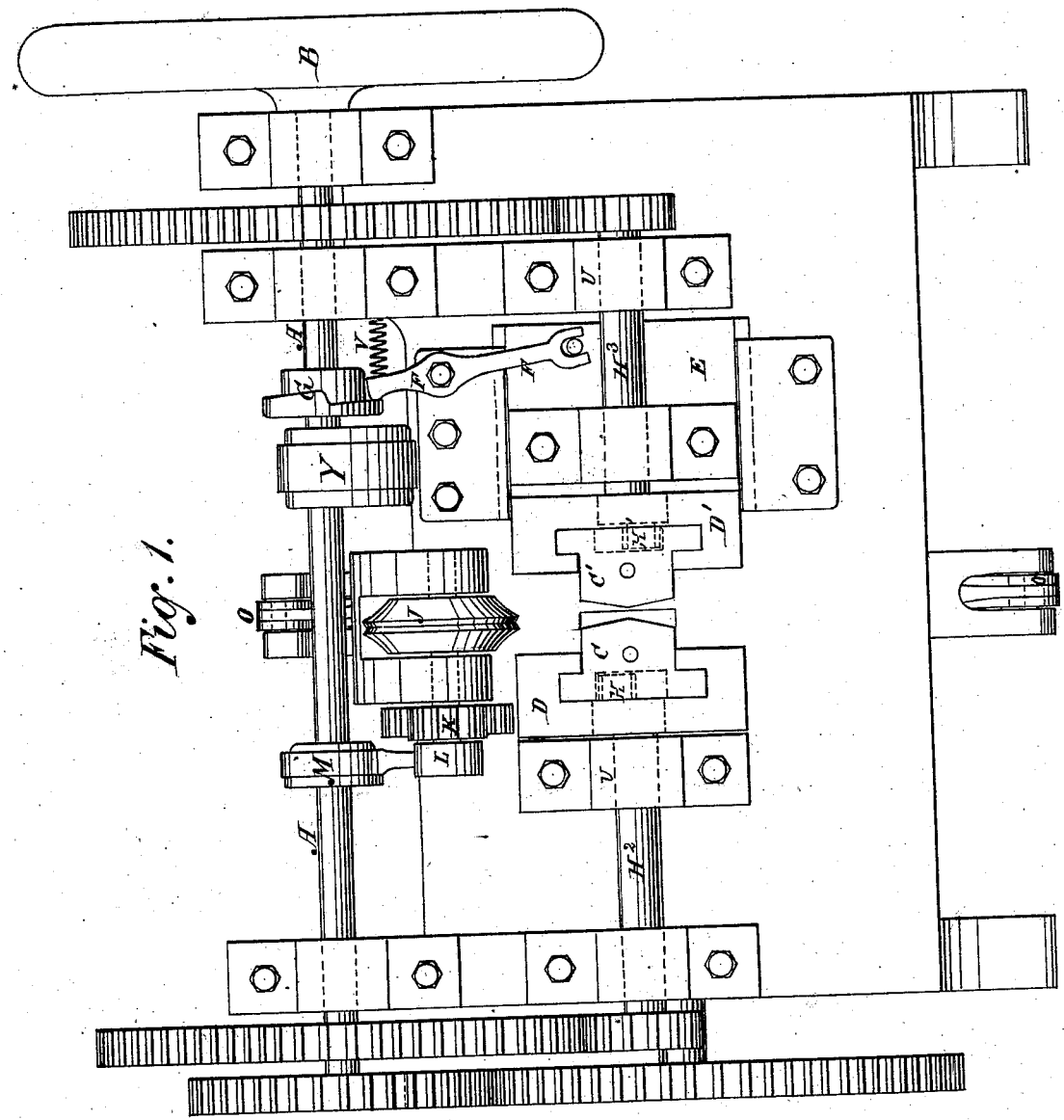
Figure 2:
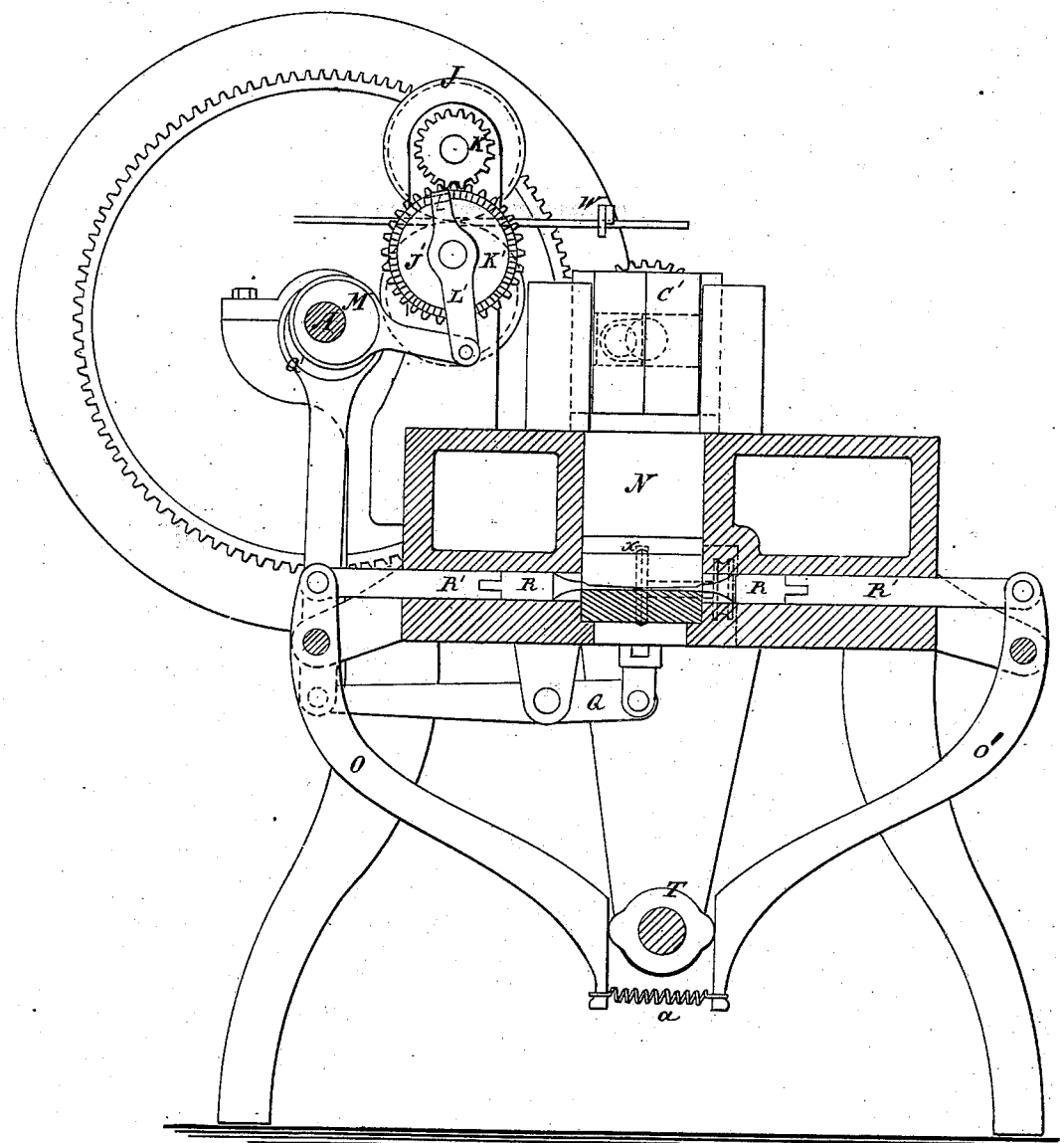

In the accompanying drawings, Figure 1 is a top view of my improved nail-machine; Fig. 2, a side elevation, partly in section, illustrating the feeding and the heading devices; and Fig. 3, a front elevation, also partly in section, illustrating the operation of the reciprocating dies and of the heading-dies.

A, Fig. 1, is the main shaft, and B the fly-wheel, of the machine.

C C' are two reciprocating shaping-dies arranged to move up and down, face to face, in parallel planes in ways formed in head-blocks D D'. (See Fig. 1.) These shaping-dies may be hollow to permit a flow of water through them for the purpose of keeping them cool. The opposite faces of these dies are each beveled (see Fig. 1) from a central line each way to the outer edges at an angle corresponding to the taper desired in the finished nail. The one head-block, D, is fixed in the frame-work of the machine. The opposite head-block, D', is supported upon a sliding bed-plate, E, so as to move to and from the fixed head-block D at right angles to the face thereof. The movement of the head-block D' and its die C' to and from the opposite die, C, is produced by means of a lever, F, pivoted midway, more or less, by its length upon the frame of the machine, so as to vibrate horizontally thereon. The outer end of the lever bears laterally against the cam-face of a pulley, G, on the main shaft, as shown in Fig. 1, and is forced against said face by a spring, V, of sufficient power to move the sliding bed-plate E, so that a reciprocating movement of said plate to and from the fixed head-plate D is produced by means of the cam G at each revolution thereof.

The alternate reciprocating vertical movement of the dies C C' is produced by means of cranks H and H', Fig. 3, upon the ends of counter-shafts H² H³, supported at right angles to the head-blocks upon suitable bearings upon pedestals U U on the frame of the machine. The ends of the crank-pins H H' pass into and engage recesses formed for their reception in the rear face of each head-block, the crank-pin H', engaging the sliding head-block D', being extended so as to engage the block throughout the entire extent of its movement.

The pillar U', carrying the inner bearings of the counter-shaft H³, is secured to the sliding bed-plate E, so as to be carried with it, as shown in Fig. 3. The counter-shafts are made to revolve by means of pinions on their outer ends gearing into spur-wheels on the main shaft.

The feeding mechanism consists of two grooved rollers, J J, revolving one above the other and in the rear of the reciprocating dies C C', between standards made to project upward from the frame of the machine to carry the journal-bearings of said rollers. The upper roller, J, is driven by means of a pinion, K, keyed upon the outer end of its axle, and which engages with a spur-wheel, K'. Upon the outer face of the spur-wheel a concentric ratchet is formed, and this ratchet is engaged by a pawl upon the upper arm of a rocking lever, L', hung (see Fig. 2) upon the arbor of said spur-wheel K', and whose longer lower arm is connected by a pitman-rod with an eccentric, M, upon the main shaft, so that at each revolution of the main shaft the pawl L shall be carried forward, and by carrying with it the spur-wheel K' produce a revolution of the roller J as required to feed forward the desired length of wire. The lower roller, J', revolves freely in its bearings, and serves simply as a carrier. The wire, after leaving the intermittent feed-rollers, passes through an aperture in a supporting-bar, W, Fig. 2, interposed between the rollers and the dies. The aperture in the bar W is traversed by a cutting-bar operated by intermediate mechanism from an eccentric on the shaft, and which serves to shear a length of the wire at each movement of the feed-rollers.

A channel, N, is provided in the bed-plate of the machine immediately beneath the shaping-dies C C', which catches the blank after it has been rolled and shaped by said dies and conveys it to the heading and swaging dies R R and S S'.

The swaging-dies S S' (see Fig. 3) are employed especially in the manufacture of horseshoe-nails, to properly flatten the same, and are arranged to close upon the blank on each side of the center thereof. One of said dies, S, on each side is fixed in the frame of the machine, and its opposite die, S', is arranged to slide to and from it in suitable ways formed to guide it. The movable dies S' are operated by means of toggle-joint levers P P, actuated by means of the shorter arm of a rocking lever, Q, whose longer arm is connected with an eccentric, Y, on the main shaft, as illustrated in Fig. 2 of the drawings.

The heading-dies R R work in tubular recesses formed in the bed-plate of the machine, so as to strike simultaneously the ends of the blank and upset them when the blank is engaged by the swaging-dies. These heading-dies are operated by reciprocating plungers R' R', moving in said recesses, as shown in Fig. 2 of the drawings, the reciprocating movement of said plungers being produced by means of rocking levers O O, pivoted to suitable brackets projecting from the frame of the machine, and whose longer arms are brought together below the frame against an interposed rotating double cam, T, fixed upon a shaft made to revolve by means of gearing from the main shaft. These levers O O' are held against the cam by means of a spring of sufficient power to cause the withdrawal of the plungers when the longer arms of the levers are not thrown out by the cams, as shown in Fig. 2.

A revolving cutter, X, (see dotted lines, Figs. 2 and 3,) is supported in the frame of the machine between the fixed swaging-dies S S, so as to bear against the center of the blank after it is caught by said dies and sever it. This cutter is driven by suitable gearing from the main shaft.

The operation of my machine is as follows: Wire from a coil is introduced between the intermittent feed-rollers J J', which, when actuated by the swinging lever L', operated by the eccentric M on main shaft, will feed forward at one movement a length of wire sufficient to form a single blank. This length of wire, projecting through the aperture in the supporting-bar W, will be cut off by the shear-cutter and drop between the shaping-dies. At the moment the cutter severs the wire the sliding block D' is made, by the operation of the lever F, to approach the fixed block D, so as to close the die C' toward the opposite die, C, and catch the wire between them, and when thus caught the dies are kept in steady contact with the wire by the direct pressure of the lever F, operated by the cam, until each die has made two up-and-down movements. The reciprocating movements of these dies in opposite directions, while bearing under powerful pressure upon the interposed blank, rolls the latter into a tapering form smaller in the center and enlarging to each end, the taper each way corresponding to the beveled face of the dies. The blank thus shaped is released, so soon as shaped, by the withdrawal of the die C', and drops through the channel N to the swaging and heading dies below, while almost simultaneously a second blank is cut from the coil above and drops between the shaping-dies. The swaging and heading dies closing upon the tapered blank simultaneously flatten its sides and form a head at each end, while the central cutter divides it, and the two finished nails, formed at the one operation, drop from the machine.

I contemplate the use of this machine for the production of tapering or pointed cylindrical metallic blanks of any description for the manufacture of various articles, such as spindles for mule-spinning, wire nails of the French pattern, and teeth of certain forms for thrashing-machines, its adaptation for producing such articles being simply obtained by changing the faces of the reciprocating swaging-dies.

The reciprocating dies C C', for shaping the blanks by a rolling pressure, may be arranged to work in a horizontal instead of a vertical position without departing from my invention, and a hopper fitted to receive and deliver to the reciprocating dies pieces of wire cut into suitable lengths may be substituted for the feed-rollers and cutting device hereinbefore described.

I claim as my invention—

The combination, in a nail-machine, of the reciprocating dies C C', cranks H' H', and shafts $H^2$ $H^3$, the reciprocating bed-plate E, lever F, and cam-pulley G, the swaging-dies S S', toggle-levers P P, rocking lever Q, and eccentric G', the heading-dies R R, rocking levers O O, and cam T, with each other and with the main shafts A and fly-wheel B, to produce at one operation, by a continuous movement of these several parts in proper unison, the manufacture of two finished nails from a single cylindrical blank, substantially as and for the purpose herein set forth.

NATHAN C. LEWIS.

Witnesses:
E. W. ROGERS,
C. R. TRASK.